United States Patent
Lintz

(10) Patent No.: US 11,541,916 B2
(45) Date of Patent: Jan. 3, 2023

(54) SLEEPER TRANSPORT VEHICLE

(71) Applicant: Plasser & Theurer Export von Bahnbaumaschinen GmbH, Vienna (AT)

(72) Inventor: Gerard Lintz, Bening les Saint Avold (FR)

(73) Assignee: PLASSER & THEURER EXPORT VON BAHNBAUMASCHINEN GMBH, Vienna (AT)

( * ) Notice: Subject to any disclaimer, the term of this patent is extended or adjusted under 35 U.S.C. 154(b) by 341 days.

(21) Appl. No.: 16/771,871

(22) PCT Filed: Dec. 21, 2018

(86) PCT No.: PCT/EP2018/086467
§ 371 (c)(1),
(2) Date: Jun. 11, 2020

(87) PCT Pub. No.: WO2019/129678
PCT Pub. Date: Jul. 4, 2019

(65) Prior Publication Data
US 2021/0179150 A1    Jun. 17, 2021

(30) Foreign Application Priority Data

Dec. 28, 2017  (AT) .................................. A 501/2017

(51) Int. Cl.
*B61D 47/00*    (2006.01)
*B61D 3/02*    (2006.01)
(Continued)

(52) U.S. Cl.
CPC ............... *B61D 47/00* (2013.01); *B61D 3/02* (2013.01); *B61D 3/14* (2013.01); *B61D 3/16* (2013.01);
(Continued)

(58) Field of Classification Search
CPC . B61D 47/00; B61D 3/02; B61D 3/14; B61D 3/16; B61D 49/00; B61D 3/10;
(Continued)

(56) References Cited

U.S. PATENT DOCUMENTS 5,119,736 A * 6/1992 Chiodi ...................... B61F 3/12
105/182.1
5,549,050 A * 8/1996 Rhodes ................... B61B 10/04
104/252
(Continued)

FOREIGN PATENT DOCUMENTS

EP    2 412 598 A1    2/2012
FR    2 931 777 A1    12/2009
(Continued)

OTHER PUBLICATIONS

International Search Report of PCT/EP2018/086467, dated Mar. 19, 2019, with English translation.

Primary Examiner — Mark T Le
(74) Attorney, Agent, or Firm — Collard & Roe, P.C.

(57) ABSTRACT

The invention relates to a sleeper transport vehicle (1) having a loading area (25) which includes a lower supporting loading plane (7) and an upper supporting loading plane (8), wherein in each loading plane (7,8) a guide (10) is arranged in which pallets (9) are guided in the longitudinal direction of the sleeper transport vehicle (1), wherein, at a front side, a transfer area (26) is arranged into which the guides (10) protrude in order to pass along during a working operation pallets (9) with new sleepers (15) in one loading plane (7, 8) to a further sleeper transport vehicle (1) or loading/unloading vehicle (34) arranged at the front side, and to receive pallets with old sleepers (16) in the other loading plane (7, 8). In this, it is provided that in each loading plane (7, 8) a pushing device (11) for pushing the pallets (9) along the guide (10) is designed as at least one
(Continued)

circulating chain protruding into the transfer area, and that coupling elements (20) are arranged on the pallets (9) for temporary coupling to the chain.

13 Claims, 3 Drawing Sheets

(51) Int. Cl.
*B61D 3/14* (2006.01)
*B61D 3/16* (2006.01)
*B61D 49/00* (2006.01)
*B65G 67/10* (2006.01)
*E01B 29/06* (2006.01)
*B61F 3/04* (2006.01)

(52) U.S. Cl.
CPC ............ *B61D 49/00* (2013.01); *B65G 67/10* (2013.01); *E01B 29/06* (2013.01); *B61F 3/04* (2013.01); *B65G 2814/0313* (2013.01); *B65G 2814/0347* (2013.01)

(58) Field of Classification Search
CPC ............ B65G 67/10; B65G 2814/0313; B65G 2814/0347; B65G 67/22; B65G 2201/0267; E01B 29/06; B61F 3/04; B64D 2009/006; B64D 9/003
See application file for complete search history.

(56) References Cited

U.S. PATENT DOCUMENTS

| | | | |
|---|---|---|---|
| 6,250,457 B1* | 6/2001 | Spurck | B65G 39/20 198/817 |
| 8,161,889 B2* | 4/2012 | Morichika | B62D 1/265 104/243 |
| 2002/0148928 A1* | 10/2002 | Oki | B64D 11/04 244/118.1 |
| 2003/0228208 A1* | 12/2003 | Grand | B65G 1/0471 414/277 |
| 2005/0175436 A1* | 8/2005 | Salm | B65G 25/08 414/331.01 |
| 2014/0123871 A1 | 5/2014 | Dehmel | |

FOREIGN PATENT DOCUMENTS

| | | |
|---|---|---|
| JP | 2003-147703 A | 5/2003 |
| RU | 2 377 355 C1 | 12/2009 |
| WO | 2012/156408 A1 | 11/2012 |
| WO | WO-2017174171 A1 * | 10/2017 ............ B61D 15/00 |

* cited by examiner

SLEEPER TRANSPORT VEHICLE

CROSS REFERENCE TO RELATED APPLICATIONS

This application is the National Stage of PCT/EP2018/086467 filed on Dec. 21, 2018, which claims priority under 35 U.S.C. § 119 of Austrian Application No. A 501/2017, filed on Dec. 28, 2017, the disclosure of which is incorporated by reference. The international application under PCT article 21(2) was not published in English.

FIELD OF TECHNOLOGY

The invention relates to a sleeper transport vehicle having a loading area which includes a lower supporting loading plane and an upper supporting loading plane, wherein in each loading plane a guide is arranged in which pallets are guided in the longitudinal direction of the sleeper transport vehicle, wherein, at a front side, a transfer area is arranged into which the guides protrude in order to pass along during a working operation pallets with new sleepers in one loading plane to a further sleeper transport vehicle or loading/unloading vehicle arranged at the front side, and to receive pallets with old sleepers in the other loading plane. The invention further relates to a method for supplying new sleepers or for taking up old sleepers by means of a sleeper transport vehicle.

PRIOR ART

Currently, sleeper wagons supply relaying trains with new sleepers for a sleeper exchange. At the sides of the sleeper wagons, crane rails are arranged on which a gantry crane travels. Between the sleeper wagons, connecting elements are required to enable a travelling from one wagon to the next. As a result of the connecting elements, not only is the freedom of movement in a curve severely limited, but also an operator is required for the gantry crane. Here, any automatizing can only be realized with difficulty. Furthermore, in case of employing several gantry cranes, a high risk of collision exists which has to be counteracted.

From JP 2003147703 A, a sleeper transport vehicle is known which has two loading planes and a lifting device at the end. In this, pallets are loaded with new sleepers which, by way of a discharge device controlled by an operator, are dumped at an unloading site and thus are discharged next to a track. As a result of the unloading next to the track, this solution is not suited for a relaying train working with the assembly line method.

WO 2012/156408 A1 shows a system for track-bound transport of objects such as, for example, sleepers. This system comprises rail-bound transport vehicles on which the objects to be transported are stored in two planes in containers. Several of these transport vehicles form a train, wherein transfer areas are located at the respective wagon ends.

SUMMARY OF THE INVENTION

It is the object of the invention to provide an improvement over the prior art for a sleeper transport vehicle of the type mentioned at the beginning. Furthermore, the invention relates to a method of operating a sleeper transport vehicle.

With regard to the device, the object on hand is achieved according to the invention by way of the combination of features according to claim 1. The object directed to a method is achieved according to the invention by way of the combination of features according to claim 12. Dependent claims indicate advantageous embodiments of the invention.

The invention provides that in each loading plane a pushing device for pushing the pallets along the guide is arranged. The respective pushing device is designed as at least one circulating chain protruding into the transfer area, wherein coupling elements are arranged on the pallets for temporary coupling to the chain. The circulating chain is a reliable solution for displacing the pallets on one of the loading planes. The coupling elements are simply positioned on the chain at a required distance.

In addition, it is useful if in each loading plane a respective circulating chain is arranged at both sides of a longitudinally extending axis of symmetry. By using two circulating chains per loading plane, a displacement force acting on the pallets is distributed evenly. By double-sided displacement, a jamming of the pallets in the guides is counteracted.

In an advantageous embodiment, the respective guide is designed as a longitudinal profile, and guide rollers for guiding along the longitudinal profile are arranged on the pallets. As a result of the pallets rolling over the guide rollers in the longitudinal profiles, a low-friction guiding of the pallet is ensured.

For low-friction displacement of the pallets it is advantageous if each pallet has at its underside longitudinal supports for placement on a rollerway. In this, the pallets are constructed in a very robust and simple manner. Additionally, they are maintenance-free since all moving parts (bearings, rollers) are arranged on the vehicle.

In this, it is favourable if a centrally extending guide and, at either side of said guide, a respective rollerway is arranged in each loading plane. By way of the centrally extending guide, the respective pallet is guided precisely on the axis of symmetry of the loading plane, and the weight load is distributed evenly on both rollerways.

Advantageously, a locking device for temporary fixation during transport travel is associated with each pallet. Thus, the pallets including the sleepers are securely held in position during travel to or from a construction site.

In a further advantageous embodiment of the invention, the transport vehicle comprises a wagon frame which is supported on bogies, wherein at least one bogie is configured as a motor bogie. Thus, autonomous travel of the transport vehicle is achieved which has an advantageous effect on automatizing working operations.

It is additionally useful if the transport vehicle has panelling elements at both longitudinal sides. If the sleepers should shift laterally within the pallet, they are still held safely within the sleeper transport vehicle and thus within the clearance gauge.

An advantageous further development provides that, above the upper loading plane, the transport vehicle has a supporting conveying plane in which at least one longitudinal conveyor belt for transport of bulk material is arranged. With this, it is possible to additionally bring in or remove also bulk material during a sleeper exchange.

In an advantageous embodiment, a lifting/lowering device for lifting or lowering a pallet from one loading plane to the other loading plane is arranged at the front side lying opposite to the transfer area. As a result, a further transport of the pallets across both loading planes is enabled when unloading new sleepers or when loading old sleepers. In this manner, both loading planes can be used for new sleeper delivery or old sleeper disposal.

A further increase in loading capacity is advantageously achieved in that the transport vehicle comprises at least two wagon frames which are articulatedly connected to one another, that a separate loading area is associated with each wagon frame, and that the loading areas are coupled to a transfer area into which the respective guides and the respective pushing devices protrude in order to push the pallets onward in the longitudinal direction across both loading areas. By articulatedly stringing together several wagon frames in this way, the loading capacity can be adapted flexibly. In this, the maximum length of the wagon frames is prescribed by a navigable minimum track radius and a clearance gauge to be observed.

The method according to the invention for supplying new sleepers or for taking up old sleepers by means of sleeper transport vehicle provides that the pallets with new sleepers, which have been pushed onward in the one loading area, are passed from the sleeper transport vehicle to the loading/unloading vehicle in the transfer area, and that in the other loading plane pallets with old sleepers are passed from the loading/unloading vehicle to the sleeper transport vehicle. In this manner, a supplying with new sleepers in assembly-line fashion and a similar removal of old sleepers takes place.

In an advantageous further development of the method, pallets are lifted or lowered from one loading plane to the other loading plane by means of a lifting/lowering device arranged at the front side lying opposite the transfer area. With this, both loading planes are included in a rotation-like supply with new sleepers or picking up of old sleepers. During this, the pallets move on the loading planes in opposite directions, wherein a transfer between the loading planes takes place by means of the lifting/lowering device.

In this, it is useful if, during a pallet transfer, the sleeper transport vehicle is moved together with the loading/unloading vehicle with a pre-set working speed along a track, the sleepers of which are exchanged by means of a sleeper changing device. In this manner, a continuous sleeper exchange takes place during which a relaying train moves forward with constant speed. Such a sleeper exchange in the continuous assembly line method is particularly effective and economical.

BRIEF DESCRIPTION OF THE DRAWINGS

The invention will be described below by way of example with reference to the accompanying drawings. There is shown in a schematic manner in.

DESCRIPTION OF THE EMBODIMENTS

Figure 2:
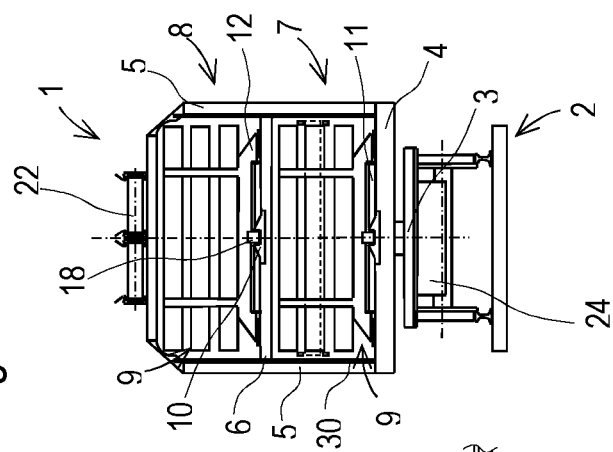
Figure 1:
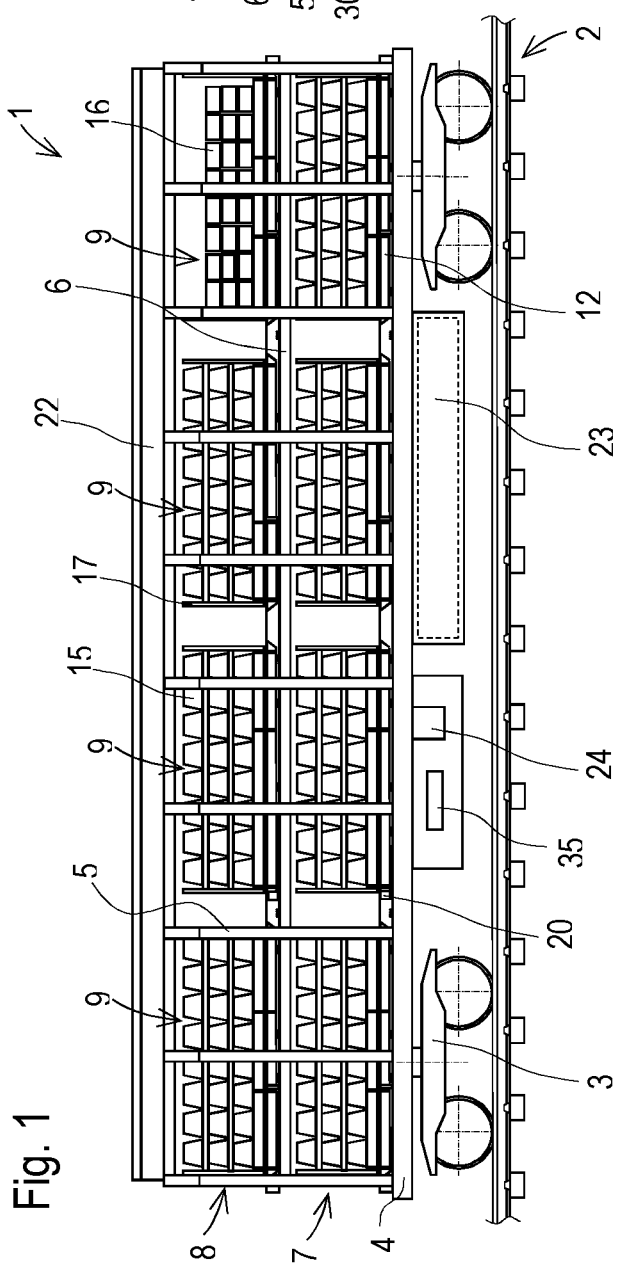
FIG. 1 a side view of a sleeper transport vehicle
FIG. 2 a front view of a sleeper transport vehicle
FIG. 3 a top view of a sleeper transport vehicle
FIG. 4 a top view of a transfer area
FIG. 5 a simplified perspective view of a transfer area
FIG. 6 a sleeper transport vehicle with lifting/lowering device
Figure 3:
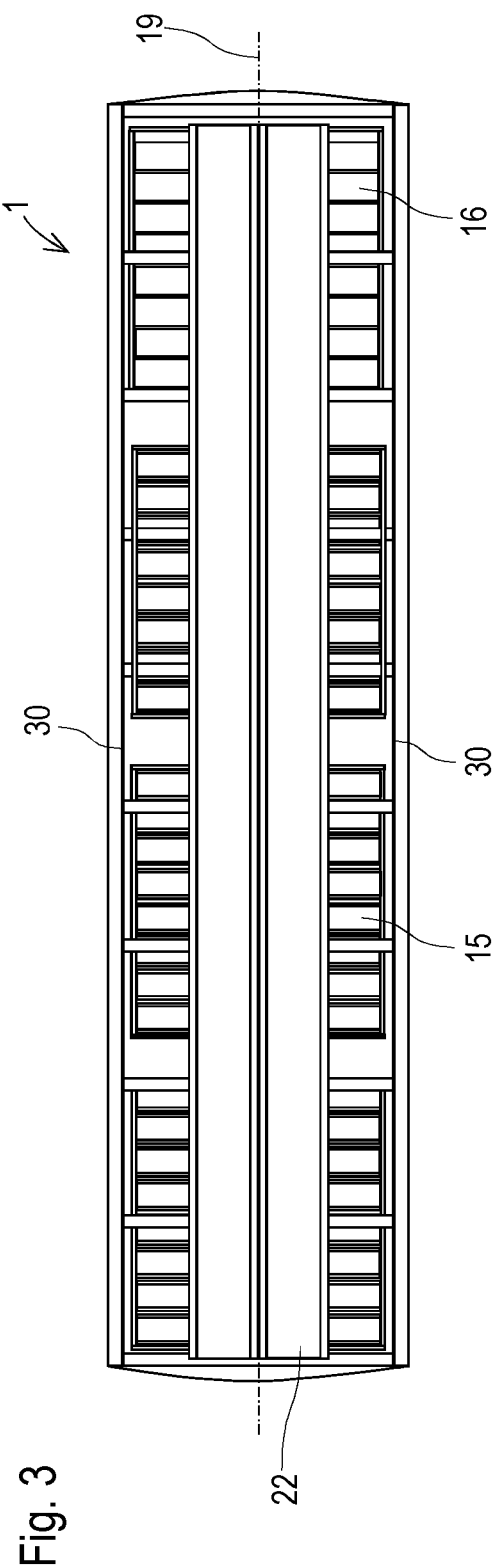

FIGS. 1-3 show different views of a sleeper transport vehicle 1 which is mobile on a track 2. The sleeper transport vehicle 1 comprises a wagon frame 4 supported on bogies 3, on which are arranged lateral poles 5 and transverse and longitudinal beams 6 connected thereto. By means of these supporting elements, a lower supporting loading plane 7 and an upper supporting loading plane 8 are formed. Pallets 9 are displaceable in the loading planes 7, 8 in the longitudinal direction of the sleeper transport vehicle 1 along a guide 10 by means of a pushing device 11.

Each pallet 9 has a carrier frame 12 supported on longitudinal supports 13. The longitudinal supports 13 are advantageously designed skid-like and rest on rollerways 14 of the respective loading plane 7, 8. The carrier frame 12 is designed having several layers, arranged one above the other, for receiving sleepers 15, 16. FIG. 1 shows a sleeper transport vehicle 1 on which seven pallets are loaded with new sleepers 15 and one pallet has already been loaded with old sleepers 16. In this illustrative loading state, one pallet 9 with new sleepers 15 has already been passed on, and the pallet 9 with old sleepers 16 has been taken up.

In order to prevent a sliding of the sleepers 15, 16 in the direction of travel, each pallet 9 has retainers 17 at the front and back which extend to the uppermost layer of the sleepers 15, 16. By means of two guide rollers 18, the respective pallet 9 is guided in the guide 10 designed as a longitudinal profile. In particular, a groove is arranged in each loading plane 7, 8 in a longitudinally extending axis of symmetry 19 of the sleeper transport vehicle 1. To prevent a lateral displacement of sleepers 15, 16, panelling elements 30 are arranged at both longitudinal sides of the sleeper transport vehicle 1. These are not shown in FIGS. 1 and 6 in order to make the inner structure visible.

Two circulating chains having coupling elements 20 are provided in each loading plane 7, 8 as a pushing device 11 for pushing the pallets 9 along the guide 10 in a horizontal plane. The chains are arranged at both sides of the axis of symmetry 19 and, during operation, have a mirror-inverted direction of circulation. In this, the outer chain strand in each case is coupled temporarily to the pallets 9 located on the corresponding loading plane 7, 8 and pushes the same forward.

Additionally, each pallet 9 is equipped with a locking device 21, releasable by remote control, which is configured for fixing the pallets 9 during a transport run. This device can be designed, for example, as a locking bolt which safely fixes the respective pallet 9. In another variant, the two circulating chains are blocked in the longitudinal direction in order to fix all pallets 9 in their position by means of the coupling elements 20.

Situated additionally above the upper loading plane 8 are two longitudinal conveyor belts 22 for transporting bulk material. Thus, a supply of new ballast and a removal of old ballast can take place simultaneously. The old ballast is discharged, for example, into a container wagon adjoining the vehicle formation.

Positioned below the wagon frame 4 is a supply unit 23. This serves for the energy supply of various drives 24 for the circulating chains, the longitudinal conveyor belts 22 and, optionally, a bogie 3 designed as a motor bogie. The drives 24 are designed, for example, as hydraulic d rives, wherein the supply unit 23 comprises a motor and hydraulic pumps. Alternatively, electric drives 24 are provided. In this, the supply unit 23 comprises a combustion engine—generator unit and, optionally, an accumulator for intermediate storage of electric energy. Additionally, a central control device 35 is provided to coordinate the individual motion sequences.

Figure 4:
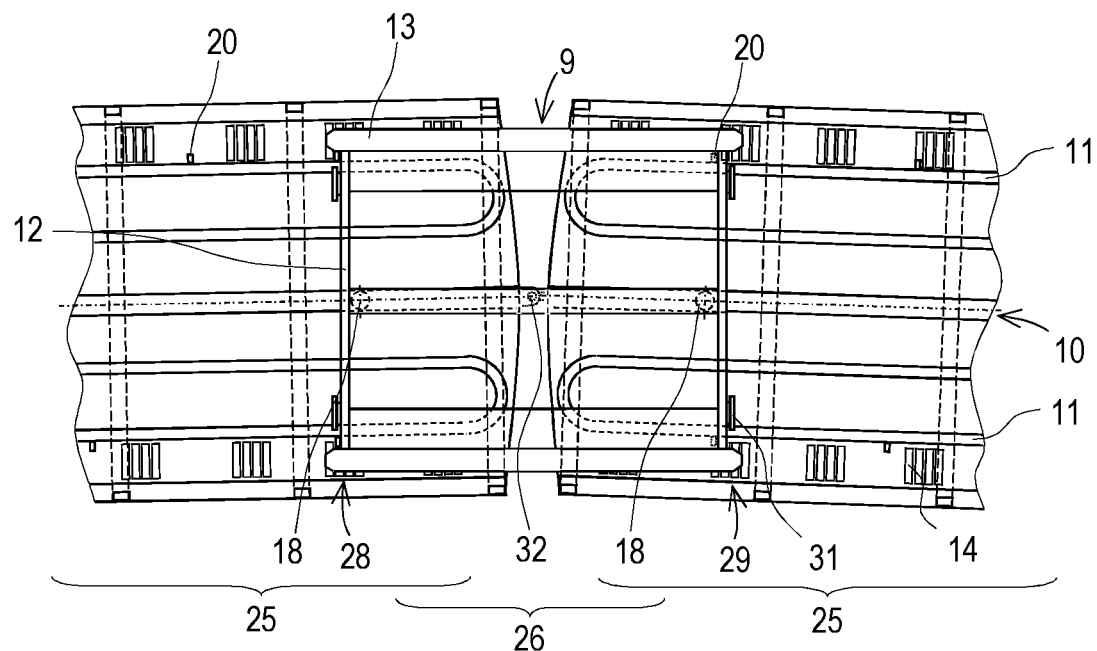
Figure 5:
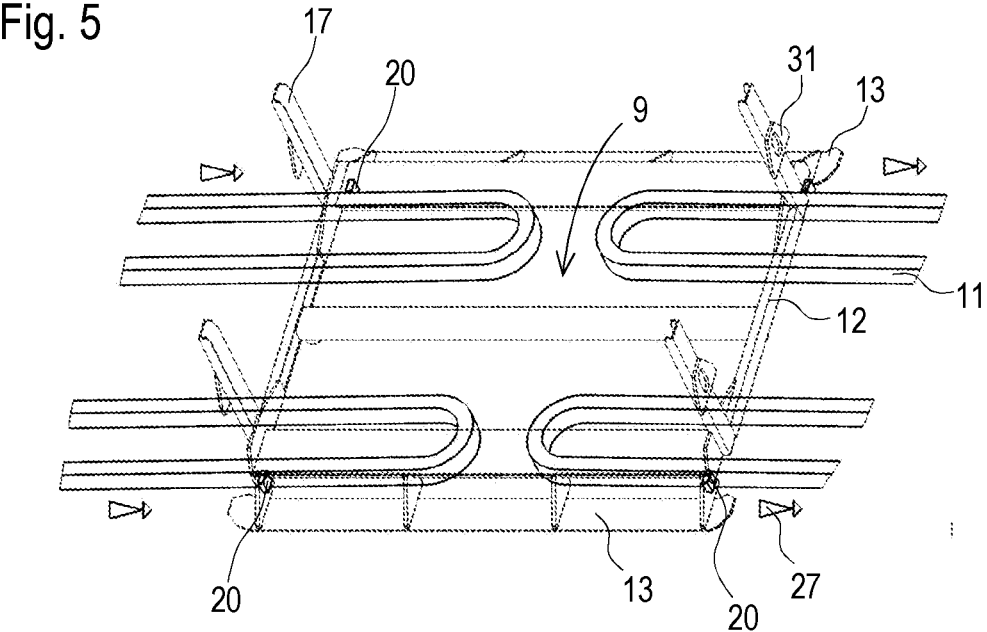

Shown in FIG. 4 are two loading areas 25 which are coupled to a transfer area 26. In the transfer area 26, a transfer of the pallets 9 from one transfer area 25 to the next takes place. In this, the two loading areas 25 are situated on two wagon frames 4 articulatedly connected to one another. A corresponding transfer area 26 to a loading/unloading vehicle 34 is also provided at the end of the sleeper transport vehicle 1. In this, a problem-free pallet transfer is also possible during travel in a curve when the two loading areas 25 are not flush aligned.

During the transfer, the respective pallet 9 is guided continuously by at least one guide roller 18 in a guide 10, since the guide 10 of the respective loading area 25 protrudes into the transfer area 26. In this, the respective loading area 25 is to be regarded as that zone in which pallets 9 are stored during transport to or from the construction site. The respective transfer area 26 overlaps with end zones of the coupled loading areas 25 and has a length extension which is shorter than a pallet length.

The respective pushing device 11 also projects into the transfer area 26, so that the pallet 9 in each case is coupled continuously to at least one pushing device 11 during a transfer. In particular, in the pushing devices 11 configured as chains as an example, the chain strand moved in a conveying direction 27 is coupled to the pallets 9. In this, the distance between the individual coupling elements 20 of the respective chain is chosen in such a way that a steady pushing forward of the pallets 9 takes place in the transfer area 26. The coupling elements 20 are designed, for example, as chain link extensions which engage at take-along points of the pallets 9 only in the conveying direction 27. In this, the respective pallet 9 is first pushed from the delivering loading area 25 into the transfer area 26 by means of coupling elements 20 engaging at the rear pallet end 28. In further sequence, the pallet 9 is pulled into the receiving loading area 25 by means of coupling elements 20 engaging at the front pallet end. Usefully, buffer elements 31 are additionally arranged at each pallet 9, by means of which a pallet 9 is pushed along in each case the conveying direction 27 by a pallet 9 following behind.

Due to the articulated connection of several wagon frames 4 by means of a respective connecting joint 32, the transport capacity of the sleeper transport vehicle 1 can be adapted to an existing construction site situation. In this, the sleeper transport vehicle 1 can be integrated into a vehicle formation in order to cover different variants of use.

Figure 6:
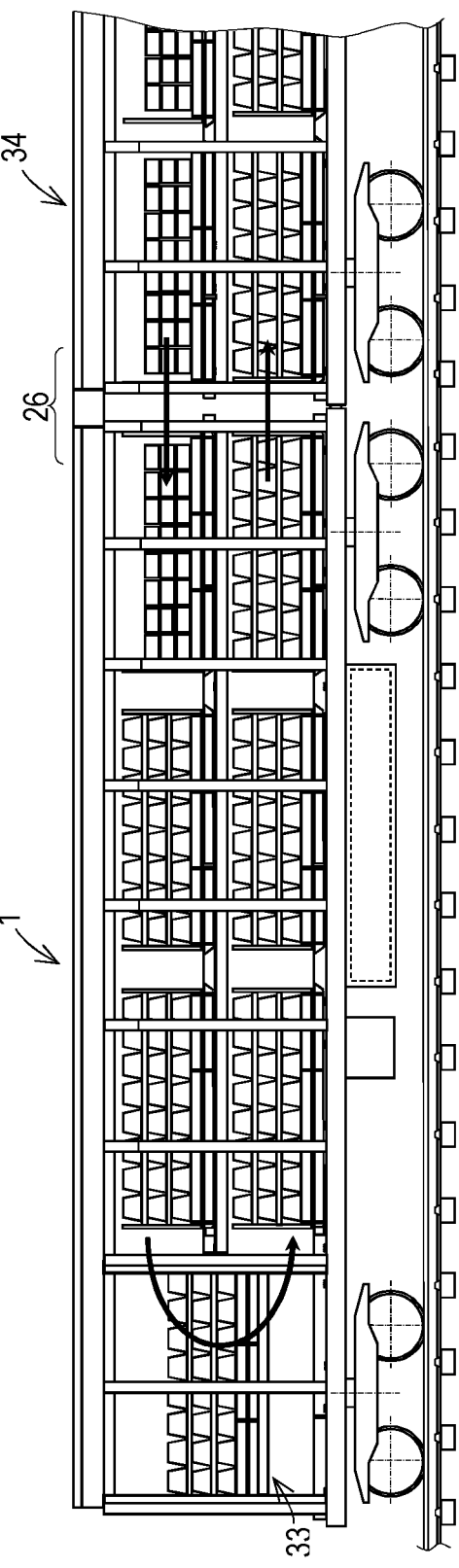

An advantageous method is explained with regard to FIG. 6. In this, a lifting/lowering device 33 is arranged at a rear face side of the sleeper transport vehicle 1. Said lifting/lowering device 33 can be designed as a simple lifting platform. Coupled to the front face side is a loading/unloading vehicle 34. This likewise comprises loading planes 7, 8 across which sleepers 15, 16 are conveyed to a sleeper laying device or from a sleeper take-up device, not shown. Alternatively, a crane-like loading/unloading device can remove new sleepers 15 from a lower pallet 9 directly in the transfer area, then deposit old sleepers 16 on the pallet 9 and lift the pallet 9 to the upper loading plane 8.

At the start of work, both loading planes 7, 8 of the sleeper transport vehicle 1 are loaded with new sleepers 15. The loading/unloading vehicle 34 removes a pallet 9 with new sleepers 15 from the lower loading plane 7. During this, the pushing device 11 of the lower loading plane 7 pushes pallets 9 forward in the conveying direction 27. Thus, a pallet space becomes available at the rear face side. Into this space, a pallet 9 is lowered from the upper loading plane 8 by means of the lifting/lowering device 33.

In the same work cycle, pallets 9 are pushed to the rear in the upper loading plane 8 and, in the transfer area 26, a transfer of a pallet 9 loaded with old sleepers 16 takes place from the loading/unloading vehicle 34 to the sleeper transport vehicle 1. The work cycle is repeated until both loading planes 7, 8 are fully loaded with old sleepers 16. In this, the conveying direction 27 can also be reversed, if required, so that new sleepers 15 are transferred from the upper loading area 8 to the loading/unloading vehicle 34.

Movements of the pallets 9 are detected via sensors and fed to the central control device 35. In this, the control device 35 is designed for automatized coordination of the individual motion sequences. During a working operation, continuous forward travel takes place which is synchronized with the working speed of the sleeper laying device or the sleeper take-up device. In this manner, the sleeper transport vehicle 1 moves along the track 2 in formation with a relaying train.

Prior to a working operation, the sleeper transport vehicle 1 is loaded at a storage site with pallets 9 which are loaded with new sleepers 15. This procedure also reasonably takes place according to the above-described rotation principle with use of a front-side lifting- and lowering device 33. In a corresponding manner, an unloading operation takes place after removal of the old sleepers 15. A combined unloading of old sleepers 15 and loading of new sleepers 16 can be useful also at the storage site, if several working operations take place one after the other.

In a simple variant, the sleeper transport vehicle 1 comprises no lifting- and lowering device 33. Then, prior to a working operation, only one loading plane 7, 8 is loaded with pallets 9 which are loaded with new sleepers 15. In the course of unloading of the new sleepers 15 at the construction site in assembly-line fashion, the other loading plane 7, 8 is loaded with old sleepers 16. Subsequently, a transport to a storage site takes place where the old sleepers 16 are unloaded.

In a further variant, the sleeper transport vehicle 1 can be composed of several vehicle units, each having its own motive drive 24. A connecting joint 32 between such vehicle units for transmission of pulling forces can be omitted. This increases the flexibility of material logistics. The vehicle units are strung together and move together in the working direction only during a pallet transport in the loading planes 7, 8. During this, the vehicle units are synchronized with one another via radio connections. Otherwise, the vehicle units are mobile separately. As soon as a sleeper transport vehicle 1 is fully loaded with old sleepers 16, it could automatically leave the vehicle formation and be replaced by a sleeper transport vehicle 1 loaded with new sleepers 15. When automatized, this would lead to greater flexibility, and coupling would only be necessary during transfer travel or a transport run.

The invention claimed is:

1. A sleeper transport vehicle comprising:
   a loading area which includes a lower supporting loading plane and an upper supporting loading plane;
   a guide is disposed in each loading plane;
   a plurality of pallets which are guided in the longitudinal direction of the sleeper transport vehicle;
   a transfer area is disposed at a front side, of the transport vehicle, into which the guides protrude in order to pass along said pallets during a working operation with new sleepers;
   a further sleeper transport vehicle or loading/unloading vehicle arranged at the front side, configured to receive pallets with old sleepers in one of the loading planes;
   a pushing device disposed in each loading plane, said pushing device for pushing the pallets along the guide, wherein said guide is designed as at least one circulating chain protruding into the transfer area; and
   a plurality of coupling elements arranged on the pallets for temporary coupling to the chain;
   at least one additional loading area;
   at least two wagon frames which are articulately connected to one another, wherein a separate loading area is associated with each wagon frame, and wherein the loading areas are coupled to a transfer area into which the respective guides and the respective pushing devices protrude in order to push the pallets onward in the longitudinal direction across both loading areas.

2. The sleeper transport vehicle according to claim 1, wherein in each loading plane there is a respective circulating chain is arranged at each side of a longitudinally extending axis of symmetry.

3. The sleeper transport vehicle according to claim 1, wherein each respective guide is designed as a longitudinal profile, and wherein each guide receives guide rollers for guiding along the longitudinal profile, wherein the guide rollers are arranged on the pallets.

4. The sleeper transport vehicle according to claim 1, further comprising longitudinal supports, wherein each pallet has at its underside the longitudinal supports for placement on a rollerway.

5. The sleeper transport vehicle according to claim 4, wherein said guides comprise a centrally extending guide and, at either side of said guide, a respective rollerway are arranged in each loading plane.

6. The sleeper transport vehicle according to claim 1, further comprising a plurality of locking devices for temporary fixation during transport travel wherein at least one locking device of said plurality of locking devices is associated with each pallet.

7. The sleeper transport vehicle according to claim 1, further comprising bogies, wherein the transport vehicle comprises a wagon frame which is supported on said bogies, and wherein at least one bogie is configured as a motor bogie.

8. The sleeper transport vehicle according to claim 1, wherein the transport vehicle has panelling elements at both longitudinal sides.

9. The sleeper transport vehicle according to claim 1, wherein, above the upper loading plane, the transport vehicle has a supporting conveying plane in which at least one longitudinal conveyor belt for transport of bulk material is arranged.

10. The sleeper transport vehicle according to claim 1, wherein a lifting/lowering device for lifting or lowering a pallet from one loading plane to the other loading plane is arranged at the front side lying opposite to the transfer area.

11. A method for supplying new sleepers or for taking up old sleepers by means of a sleeper transport vehicle according to claim 1, comprising passing the pallets with new sleepers, which have been pushed onward in the one loading area, from the sleeper transport vehicle to the loading/unloading vehicle in the transfer area, and wherein in the other loading plane pallets with old sleepers are passed from the loading/unloading vehicle to the sleeper transport vehicle.

12. The method according to claim 11, further comprising the step of lifting or lowering pallets from one loading plane to the other loading plane by means of a lifting/lowering device arranged at the front side lying opposite the transfer area.

13. The method according to claim 11, further comprising moving the sleeper transport vehicle together with the loading/unloading vehicle with a pre-set working speed along a track, the sleepers of which are exchanged by means of a sleeper changing device.

* * * * *